(No Model.) 2 Sheets—Sheet 1.
F. L. THOMAS.
VEHICLE FIFTH WEEL.
No. 573,722. Patented Dec. 22, 1896.
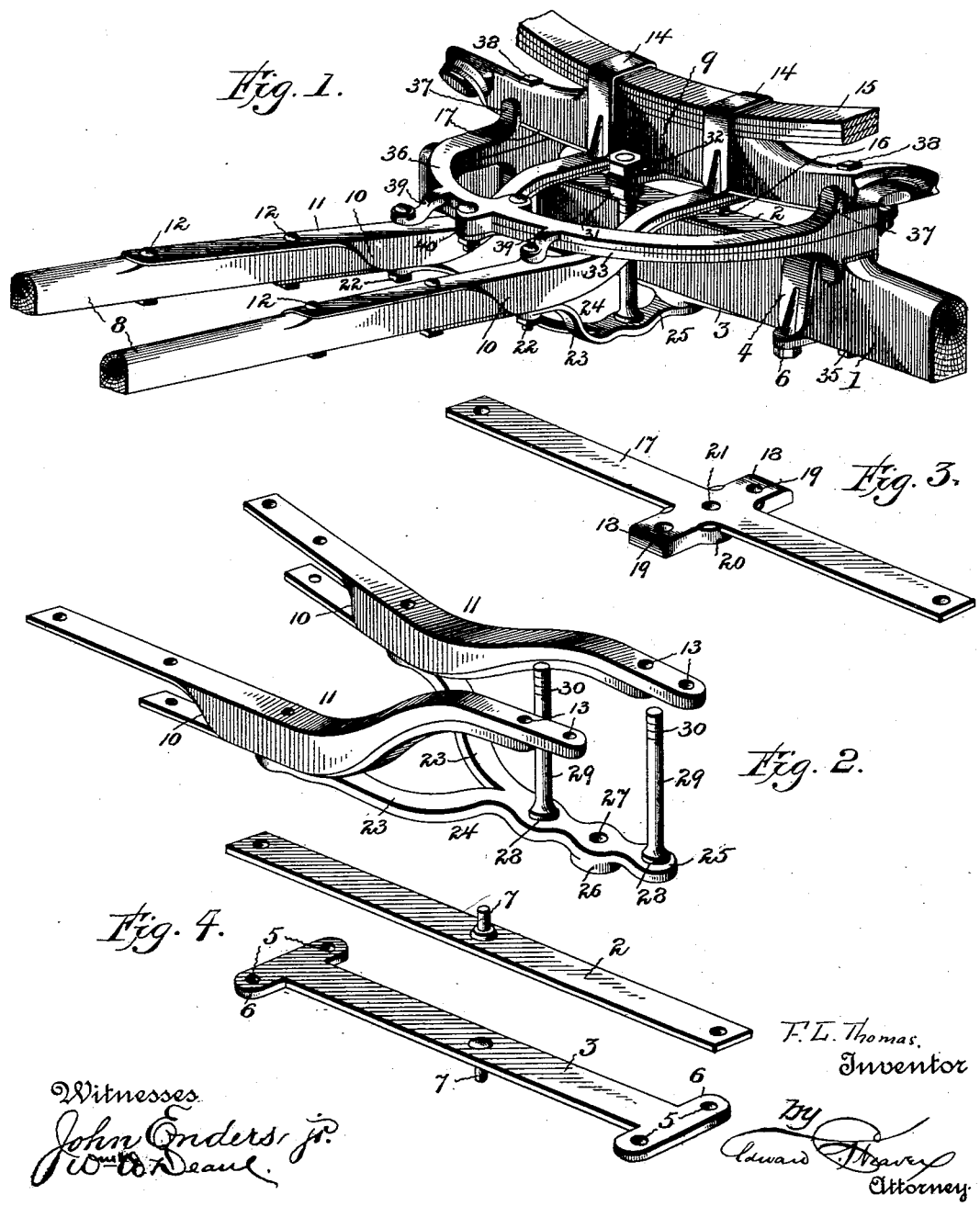

(No Model.)  2 Sheets—Sheet 2.

F. L. THOMAS.
VEHICLE FIFTH WHEEL.

No. 573,722. Patented Dec. 22, 1896.

Witnesses
John Enders Jr.
Wm. A. Deane

F. L. Thomas, Inventor
By Edward Weaver, Attorney

UNITED STATES PATENT OFFICE.

FRANCIS L. THOMAS, OF YOUNGSTOWN, OHIO.

VEHICLE FIFTH-WHEEL.

SPECIFICATION forming part of Letters Patent No. 573,722, dated December 22, 1896.

Application filed April 13, 1896. Serial No. 587,338. (No model.)

*To all whom it may concern:*

Be it known that I, FRANCIS L. THOMAS, a citizen of the United States, residing at Youngstown, in the county of Mahoning and State of Ohio, have invented certain new and useful Improvements in Vehicle Fifth-Wheels, of which the following is a specification, reference being had therein to the accompanying drawings.

My invention relates to improvements in fifth-wheels for carriages and other vehicles; and the object of the invention is to connect the perch to the wheels in a manner to avoid wrenching the parts and breaking the pivotal pins, to so connect the members thereof as to prevent rattling and render the fifth-wheel noiseless in action, and to provide a device for taking up positively the wear between the segments and to avoid piercing the axle for the king-bolt, thereby weakening it.

I will now fully describe the preferred form of my invention with the aid of the accompanying drawings, in which—

Figure 5:
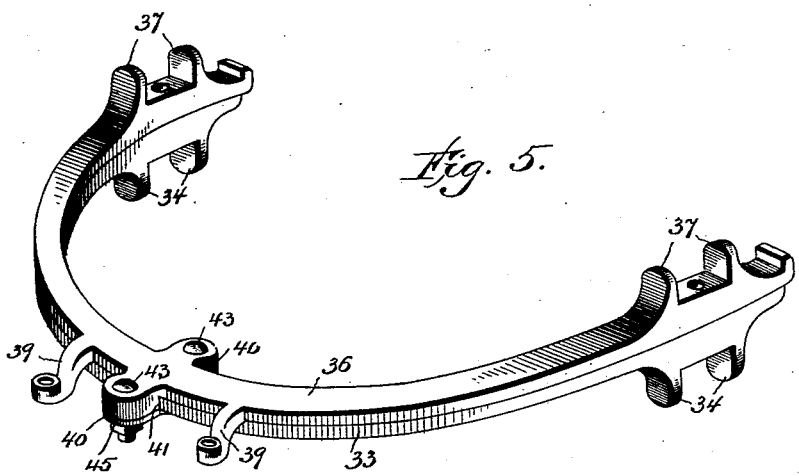
Figure 6:
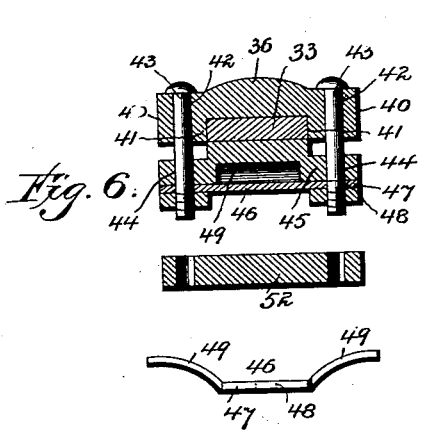
Figure 7:
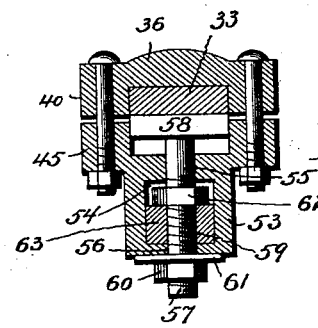
Figure 8:
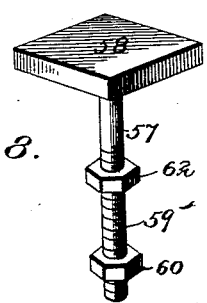

Figure 1 is a perspective view of my invention when completely assembled. Fig. 2 is a view of the perch-irons. Fig. 3 is a view of the head-block irons. Fig. 4 is a view of the axle-cap. Fig. 5 is a view of the segments. Fig. 6 is a transverse section of the device for maintaining the contact of the segments, and Fig. 7 is a transverse section of an improved form of Fig. 6. Fig. 8 is a view of details.

The same numeral indicates the same part in each of the several views.

1 is the axle of the vehicle, to the mid portion of which are secured the plates 2 and 3, one above and one below, by means of the U-clips 4, the legs of which pass through the holes 5 in the lugs 6 of the said plate 3, and are secured by means of threaded nuts. Projecting from the face of the plates 2 and 3 are the studs 7, to which are pivotally secured the perch 8 and the head-block 9 of the vehicle.

The perch 8 of the vehicle, as shown in the drawings, is the double one now common in light vehicles, the arms thereof entering the sockets 10 of the perch-irons 11 and being secured thereto by bolts 12. The free ends of the irons 11 are provided with the holes 13, through which project the legs of the U-clips 14, embracing the head-block 9 and the vehicle-springs 15, being secured by means of the nuts 16. The clips 14 also retain in place upon the under side of the head-block the stay-plate 17, having the lateral lugs 18 with holes 19, and the boss 20 with the recess 21 therein, adapted to engage and retain the stud 7 of the plate 2, already described.

Secured to the under side of the socket portion 10 of the perch-irons 11 by the bolts 22 are the legs 23 of the spider-iron 24, the third leg 25 of which has a thickened portion 26, with the hole 27 therein to engage and retain the stud 7 of the plate 3, already mentioned, and the holes 28 disposed upon opposite sides of the hole 27. In the holes 28 are shouldered and riveted the bolts 29, with the screw-threaded ends 30 extending through the holes 19 of the plate 17 and secured therein by means of the screw-threaded locking-nuts 31 and the set-nuts 32.

Resting upon the ends of the plates 2 are the extremities of the fifth-wheel circle or segment 33, having the depending ears 34, embracing the said plate 2 and the axle 1, the three parts being secured by the bolt 35, countersunk in the material of the segment 33 and passing through the axle 1.

Adapted to slide upon the segment 33 is a similar segment or circle 36 with the projecting ears 37 at the ends embracing the ends of the plate 17 and the head-block 9, the three parts being secured together by the bolts 38, countersunk in the material of the segment and extending through the head-block. The segment has at its mid portions the two stay-arms 39, secured to the upper faces of the sockets 10 of the perch-irons 11 by means of the bolts 22, already described. Midway between the stay-arms 39 are the lateral lugs 40, the purpose of which will now be described.

The lugs 40 depend upon each side of the segment 36, forming the shoulders 41, between which moves the segment 33. Through the lugs 40 are the holes 42 for the bolts 43, passing through the holes 44 of the spanning-plate 45, which passes beneath the segment 33 and retains it in its seat. In order that the segments may be brought into contact with a constant but slight and resilient pressure, certain spring devices are introduced between the spanning-plate 45 and the retaining devices therefor. One of these is shown in the cruciform-plate 46, the arms 47 of which have the holes 48 for the bolts 43, and the arms 49 of which are bent upward and impinge the spanning-plate against the segment 33.

A further construction is shown in Fig. 7, where the spanning-plate 45 has a depending boss 53, with the open chamber 54 therein and the holes 55 and 56 in the top and bottom thereof, through which passes shank 57 of the presser-plate 58, adapted to press upon the segment 33. The shank 57 has screw-threads 59, and is secured into position by the threaded nut 60, the washer 61, and the threaded nut 62, located within the boss 53, and having either a rubber cushion 63 or a spiral spring between it and the base of the boss. It will be readily seen that the nut 60 will raise and lower the plate 58, while the nut 62 will vary the elasticity of the cushion 63.

There are certain useful ends attained by the construction I have described which it may be well to briefly describe.

One very important feature of my invention is that the perches, the head-block, and the axle may be each properly ironed ready for assemblage, and that when so ironed the said parts are capable of being closely stored away, presenting no awkward proportions. Moreover, they may be readily and rapidly assembled for the completion of the vehicle running-gear.

My method of staying the perch to both the head-block and to the axle by means of the irons 11 and the spider 24 maintains the parts in their proper plane and avoids the breaking strain otherwise placed upon the gear at the point Z. Moreover, the wear between the segments of the fifth-wheel may be taken up by the nuts 31 and 32 in the manner already described. Moreover, the piercing of the axle and its irons is avoided, adding materially to the strength thereof.

Having fully described my invention, what I desire to secure by Letters Patent and claim is—

In a fifth-wheel for vehicles, the combination with the head-block and axle, the plates on upper and lower side of axle provided with projections, the segments secured respectively to the head-block and axle, the rearwardly-projecting stay-arms on the upper segment, the perch-arms secured to the head-block and to said stay-arms, the spider consisting of the arms secured to the under side of the stay-arms, and the forwardly-extending arms formed with a bolt-hole for engaging with the projection on the axle and provided at opposite sides of said hole with vertical screw-bolts, and the plate on the head-block provided with oppositely-extending apertured lugs with which said screw-bolts engage, of the front and rear lateral lugs on the upper segment formed with shoulders, the spanning-plate located below said lower segment, and the spring-plate pressing against said lower segment, substantially as described.

In testimony whereof I affix my signature in presence of two witnesses.

FRANCIS L. THOMAS.

Witnesses:
B. F. EVANS,
JOHN GARDNER.